United States Patent
Balasubramanian et al.

(10) Patent No.: US 6,414,690 B1
(45) Date of Patent: Jul. 2, 2002

(54) GAMUT MAPPING USING LOCAL AREA INFORMATION

(75) Inventors: Thyagarajan Balasubramanian, Webster; Karen M. Braun, Henrietta, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/457,022

(22) Filed: Dec. 8, 1999

(51) Int. Cl.$^7$ .............................................. G06T 11/40
(52) U.S. Cl. ..................... 345/589; 345/600; 382/167
(58) Field of Search ................................ 345/589–593, 345/597–605; 382/167, 162, 163, 164, 165, 166; 358/518

(56) References Cited

U.S. PATENT DOCUMENTS

| | | | | |
|---|---|---|---|---|
| 5,450,216 A | * | 9/1995 | Kasson | 358/518 |
| 5,579,031 A | | 11/1996 | Liang | 345/154 |
| 5,883,632 A | | 3/1999 | Dillinger | 345/431 |
| 5,903,275 A | | 5/1999 | Guay | 345/430 |
| 5,956,468 A | * | 9/1999 | Ancin | 358/1.9 |
| 6,157,735 A | * | 12/2000 | Holub | 382/167 |

OTHER PUBLICATIONS

T.Morimoto et al, "Objects' Color Matchings Based on Image Clustering", Japan Hardcopy '98, p. 371ff.*

R. Rolleston, "Using Shepard's Interpolation to Build Color Transformation Tables", Proceedings of IS&T/SID's Color Imaging Conference, 1994, pp. 74–77.

John McCann: "Lessons Learned from Mondrians Applied to Real Images and Color Gamuts", Proc. IS&T/SID seventh Color Imaging Conference, Nov. 1999, XP002188517, p. 7, column 2.

* cited by examiner

*Primary Examiner*—Matthew Luu
*Assistant Examiner*—Thu-Thao Havan
(74) *Attorney, Agent, or Firm*—Mark Costello; Mark Z. Dudley (57) ABSTRACT

A color printing process, printing a color image in which out-of-gamut original colors are present. Each pixel is reviewed in context of its neighbors prior to remapping, so that a remapping function may take local area information into account in the remapping process.

15 Claims, 9 Drawing Sheets

NEAREST POINT
ALGORITHM

GAMUT MAPPING USING LOCAL AREA INFORMATION

CROSS REFERENCE

Cross-reference is made to copending patent application Ser. No. 09/435,308, filed Nov. 5, 1999, entitled, "Gamut Mapping Preserving Local Luminance Differences" by Balasubramanian et al. and patent application Ser. No. 09/435,256, filed Nov. 5, 1999 entitled, "Gamut Mapping Preserving Local Luminance Differences with Adaptive Spatial Filtering", by R. Balasubramanian et al. These applications are also incorporated by reference for their teachings.

The present invention is directed to improving the selection of printer colors where the original document selects colors that are out of gamut, and more particularly to a gamut-mapping method that preserves spatially local luminance differences.

BACKGROUND OF THE INVENTION

Printing devices and display devices all inherently have a region of operation, sometimes referred to as a gamut. Because such image reproduction devices are non-ideal, they cannot reproduce every possible color that can be seen by a human. Gamut mapping is often used because the color range that is possible to reproduce with one device, such as a display, is commonly not identical with the color range possible to reproduce with another device such as a printer. Thus, while both display and printer have a large number of colors that are reproducible by both, there may be certain combinations of sets of color values that are outside the reproduction capability of one or the other. However, users expect printers to reproduce images created or viewed on the display in a manner that preserves their original intent. Furthering the problem, different printing technologies and materials inherently provide different gamuts even among each class of devices.

Gamut mapping serves to map pixels defined by colors not printable by the printer or resulting from initial image processing into colors printable by a real printer. In doing so, out-of-gamut, unprintable colors are mapped to printable colors in accordance with some scheme designed to maintain color intent and aesthetic appearance. One of the most common schemes is to map any out-of-gamut pixel to its closest in-gamut neighbor. Obviously this is not satisfactory, because in a region of slight color variation, that is out-gamut, a number of similar colors may be mapped to the same in-gamut color. Some textures, highlights, and shadows in an original image will be lost.

This problem leads to a generalization that a fundamental problem of traditional gamut-mapping processes is that they are pixelwise operations that do not take neighborhood effects into account. Looking at one example, illustrated at FIG. 1, when blue text is placed against a black background, the original monitor or display has no difficulty in providing an image that clearly distinguishes the blue and black regions. However, the highly saturated blue color may be out of gamut of some printers, and black is commonly mapped to the printer's blackest reproduction. For large area reproduction, this maybe entirely acceptable. However, with the colors juxtaposed, looking at a luminance profile as in FIG. 2, the luminance difference is decreased dramatically, rendering the appearance difference on the printed page problematic.

Figure 3:
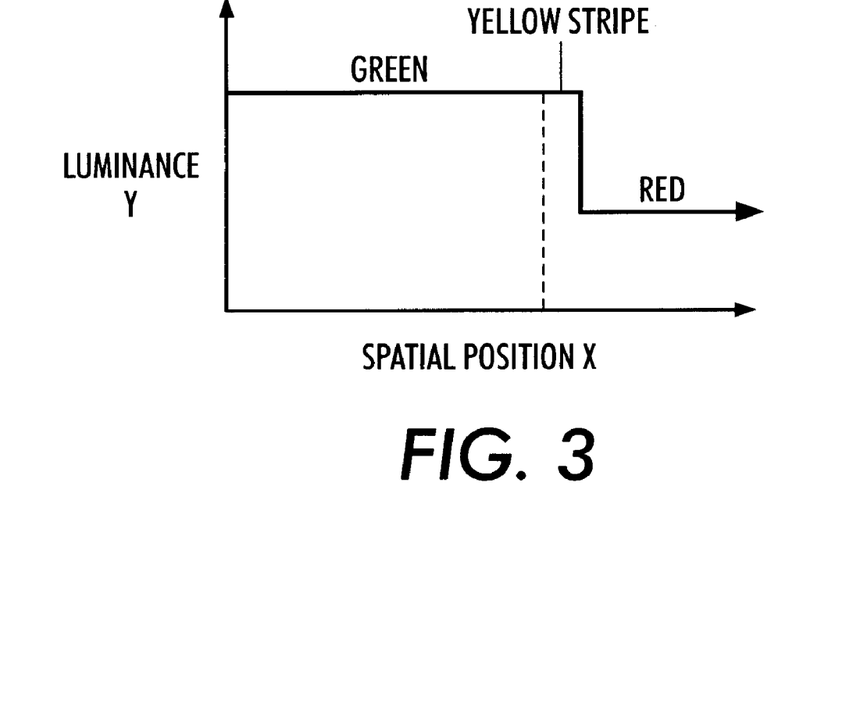
Figure 4:
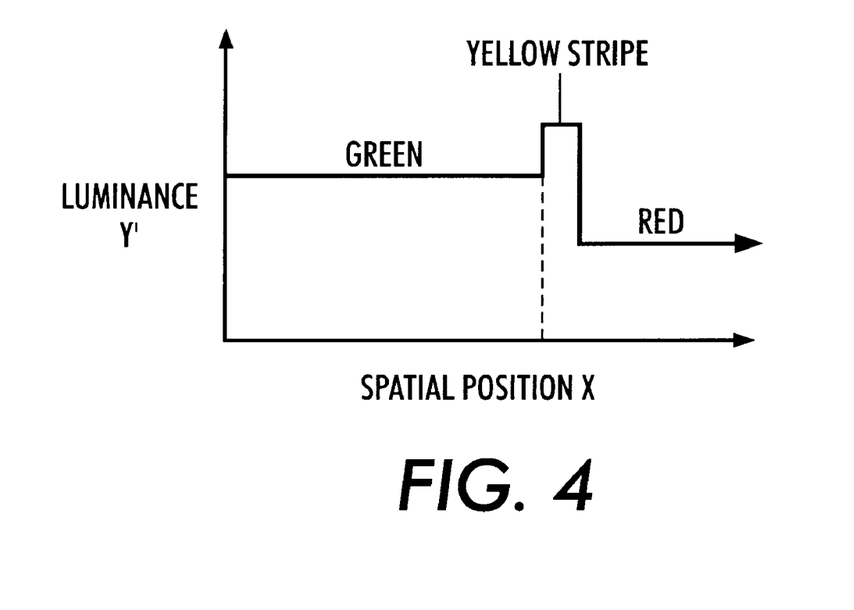

In another example, shown in FIG. 3, a saturated red/green edge that has been processed with JPEG compression and decompression, results in an intermediate yellow color produced at the edge. The stripe of yellow color is not readily visible, however, when its luminance matches its green neighbor. However, as illustrated in FIG. 4, gamut mapping applied to the red/green edge will tend to decrease the luminance of the green side of the edge, while allowing the yellow, which is within gamut, to print at its same luminance level, thus rendering it much more apparent and objectionable.

A similar problem occurs in antialiasing, where edge softening of saturated color edges results in printable colors, and inconsistent out-of-gamut mapping of the saturated colors causes the softened edge to stand out from the background and foreground colors.

U.S. Pat. No. 5,579,031 to Liang describes the use of a printer model in the calibration, where the model is iteratively updated to form a final LUT. While the use of a transform like the LUT described in itself inherently provides color matching between the two devices considered, additional color gamut mapping may be used in the development of the LUT, by performing a preselected mathematical manipulation that maps the input set of color values to lie within the range of values from the printer model. Such mathematical manipulation may be as simple as truncation or as complicated as data compression.

U.S. Pat. No. 5,883,632 to Dillinger describes preservation of relative position by geometric transform on "hue pages". Device-space color specifications for two color-presentation devices are interrelated through the intermediary of at least one perceptual color space. This interrelation is performed by either tabulations or real-time software processing, and in such a way that color, and color changes, specified in relation to one device—in a control language of that device—are tracked in both the language and the actual performance of the other device. This mapping through perceptual space can be used to produce the effect of matching the two device gamuts to each other, so that the full gamuts of both are in effect merged. When so used, this new kind of mapping preserves relative positions in color space—and thus the capability of the tracking device to maintain distinctions between colors seen on the source/input device that appear very closely similar. Such discrimination between adjacent colors can be supported essentially throughout the gamut of both devices and in particular even very near the lightness extrema and maximum-saturation point on a hue page.

An article by T. Morimoto et al., "Objects' Color Matchings Based on Image Clustering" (Japan Hardcopy '98 p. 371 ff), teaches image segmentation and color mapping for the different objects.

U.S. Pat. No. 5,903,275 to Guay describes a gamut mapping in which saturated colors (i.e., out of gamut colors) are mapped to device saturated values (device printable saturated colors). Colors inside the gamut are mapped to "closest" and other colors to a blend between closest values colorimetrically and in saturation. First, the printable colors are measured is some device independent color space, such as L*a*b*. Next, the range of colors from some reference color CRT, consisting of the colors from black to monitor saturates, and the colors between, then from saturates to white, and the colors between, are calculated. The saturates are assigned colors based on what printable color a user would like to get when the user asks for a saturated CRT color. This gives the printer's representation of the outer range of the color gamut of the CRT. Next, a table is generated that subsamples all colors available to the specified color space. This table fills in entries within the color gamut of the target printer with the closest printable color. Colors out of the printer's gamut are represented by an averaging of the printable colors and of the outer range of colors assigned for the saturates. A requested color is converted to the reference color space, then looked up in the table, and the resulting color specification is sent to the printer.

U.S. Pat. No. 5,450,216 to Kasson describes gamut-mapping color images in device-independent form to device-dependent gamut in a perceptual color space. Digital images are mapped to any device-dependent gamut in a manner that minimizes the human visual response both to the luminance and the chrominance changes necessary to force out-of-gamut pixels into the specified device-dependent gamut. A "neighborhood gamut mapping" technique considers the subjective visual effects of nearby pixels on the mapping of each pixel. At low spatial frequencies, image luminance is biased toward the luminance in the device-dependent gamut at which the greatest chroma magnitude is available for a fixed hue angle. Spatial filtering exploits the differing spatial frequency regions of insensitive human visual response to both luminance and chrominance changes.

An article by R. Rolleston entitled "Using Shepard's Interpolation to Build Color Transformation Tables" (Proceedings of IS&T/SID's Color Imaging Conference, 1994, pp 74–77), teaches a method of interpolating multi-dimensional data using a technique called Shepard's interpolation wherein a distance weighted average of mapping vectors at known points is used to approximate a mapping vector at an arbitrary input point. This technique is used to generate mappings between device independent color and device dependent color.

The references cited herein are incorporated by reference for their teachings.

SUMMARY OF THE INVENTION

In accordance with the present invention, there is provided a method of gamut mapping that preserves variations in color within a local neighborhood of pixels in the image.

A method of remapping colors in an original document, preparatory to use in a system having an output system gamut different than originally applied including: for a target pixel in a set of pixels defining at least a portion of an image, storing a set of neighboring pixels including said target pixel; analyzing said set of neighboring pixels, determining for any clusters, at least one metric for said clusters; determining at least one key color within said set; using said at least one cluster metric, mapping said at least one key color to a new remapped key color inside said output gamut; from said remapped key color, determining a mapping vector; and using the mapping vector to remap said pixel of interest.

The present invention seeks to preserve spatially local luminance variations in the original image, by mapping a target pixel to a new color that reflects neighborhood information from the original gamut. In doing so, within a portion of the image, color differences among pixels are maintained.

The invention may take form in various components and arrangements of components, and in various steps and arrangements of steps. The drawings are only for purposes of illustrating a preferred embodiment and are not to be construed as limiting the invention:

Figure 5:
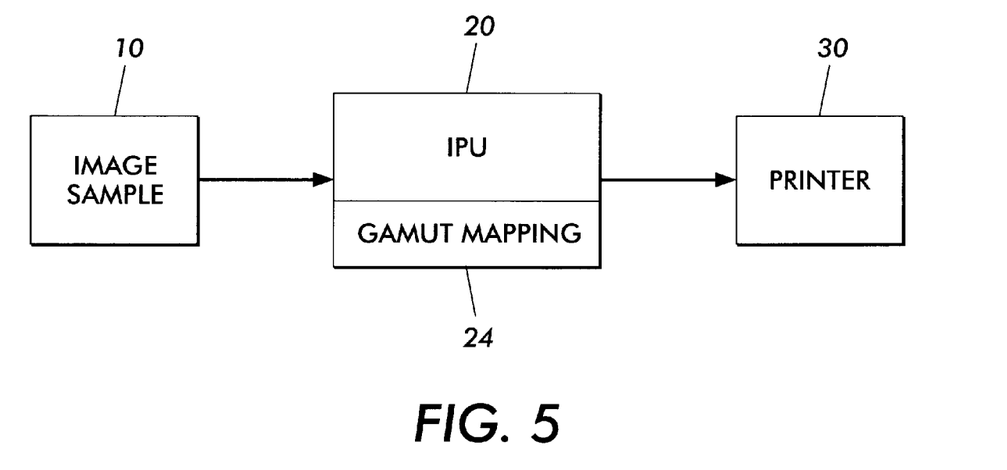
FIG. 5 illustrates a printing system in which the present invention finds advantage.

Referring now to the drawings where the showings are for the purpose of illustrating an embodiment of the invention and not for limiting same, a basic system for carrying out the present invention is shown in FIG. 5. In such a system, a source of original images 10, perhaps a color scanner, a personal computer or workstation with appropriate document or image creation software, a camera or a data storage device, produces an image, typically in a device independent manner, to provide suitable electronic images. The images are defined in pixels, each associated with a color defined in terms of CIE color space L*, a*, b*, or some other luminance-chrominance space (L, C1, C2) or an analytic transform thereof.

An image from image data source 10 is directed to an image processing unit (IPU) 20, which, for the purposes of description includes all of the digital processing requirements to convert an image from its original data representation to a format suitable for printing at printer 30. Depending on the image representation, image decomposition from a PDL, halftoning from gray level images, color transforms, scaling and any other process required, is represented by the IPU 20. IPU 20 can take various forms and operational details, and ranges from dedicated, and hardwired or software-driven operation in conjunction with high speed printing devices, to printer drivers running on personal computers or workstations driving personal printers. Called out particularly is the gamut-mapping function 24, which will be further described below. It will no doubt be appreciated that the colors may be described in RGB color space, and readily converted to other device independent color spaces where calculations can more readily be performed. This may readily be part of the functionality of IPU 20.

Printer 30 can be any color printer, printing a plurality of separations which, when superimposed, form a multicolor image. For the purposes of the present invention and its description, the printer functionality could be replaced or arranged in parallel with a display or monitor.

Gamut-mapping function 24 serves to map pixels defined by colors not printable by the printer, or resulting from initial image processing, into colors printable by the real printer. In doing so, out-of-gamut, unprintable colors are mapped to printable colors in accordance with some scheme that attempts to optimize retention of the color relationships within the document. Colors that fall within the output gamut may also be adjusted to retain the relationships to the mapped colors.

When referring to colorimetric or device independent spaces, the reference is to color space definitions that are transforms of CIE XYZ space (1931). When we refer to device dependent space, we refer to a color space that is defined only in terms of operation of the device using it. While many color spaces have three dimensions, it is possible to have color spaces with less than three dimensions or more than three dimensions and likewise, it is possible for printers to use less than three colorants or more than four colorants.

In the following discussion, the term "luminance" is used generically to encompass the strict definitions of luminance (i.e., the Y component in XYZ) and lightness (i.e. the L* component in L*a*b*). Chrominance components C1 and C2 are likewise generic manifestations of opponent color signals, or the equivalent polar representations, chroma and hue. It should understood that exact input luminance values cannot always be preserved through the gamut mapping, since this can result in undesirable trade-offs in the other attributes, hue and chroma. The optimum trade-offs in these attributes for various combinations of device gamuts, image types, and rendering intents is not the focus of the invention, and not discussed in detail here.

Figure 6:
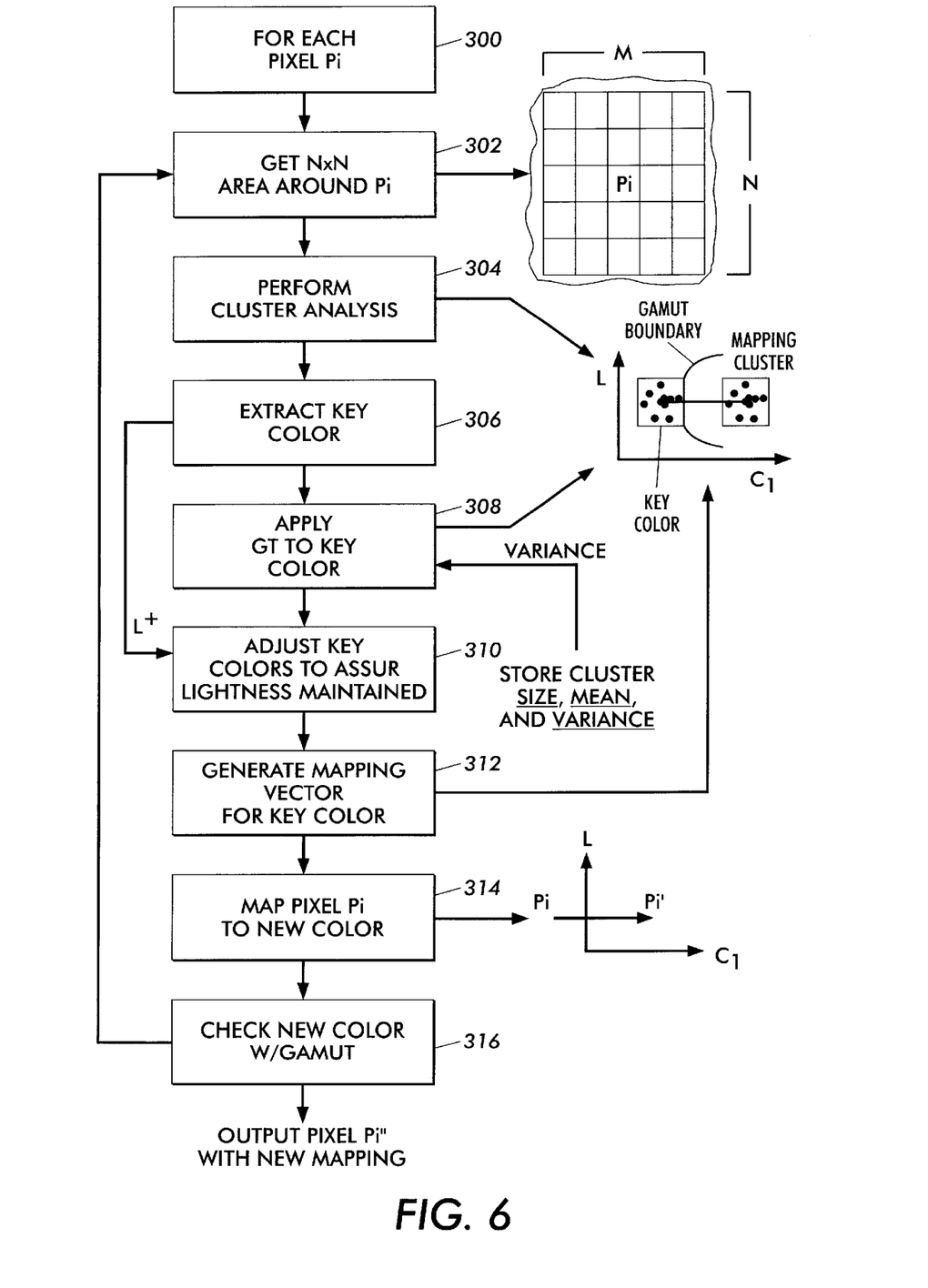
FIG. 6 is a flow chart with inset illustrations showing a second embodiment of the present invention.

Generally, the inventive method of remapping colors in an original document, preparatory to use in a system having an output system gamut different than originally applied includes a process for establishing color context for each pixel by looking at a block of pixels at a time, using that color context to remap at least one key color defined for said block, and then using the change defined for the said at least one key color to move the target pixel to an in-gamut color With reference now to FIG. 6, starting with step 300, for each input pixel:

i. Context is established within a local area. Take a local block of N×M pixels surrounding the input pixel (step 302). N may or may not equal M, as per the inset.

ii. Context is measured for the local area. Do a cluster analysis on the pixels to extract significant clusters (step 304). Retain cluster sizes, means and variances. Other cluster metrics may be used, altering the process slightly.

iii. At least one key color in the local area is identified. Extract key colors as cluster averages in the original input block (step 306).

iv. Apply a gamut-mapping function $G_T$ to key colors (step 308). For those key colors with large cluster variances, move key color further inside the gamut (see the inset).

v. Adjust the mapped key colors to ensure relationships of key-color luminances are preserved from step iii to step iv (Step 310).

vi. Generate mapping vector for each key color (Step 312)

vii. The change is applied to the target pixel based on the said mapping vectors of the key colors. Move target pixel in a direction that is a distance-weighted average of the key mapping vectors, distance being measured in color space. (Step 314) (See the step 314 inset).

viii This warped image may need to be gamut mapped to the gamut surface, since it is not assured that the direction found in (vii) will be within the output gamut (step 316).

The base gamut-mapping algorithm, $G_T$, is chosen to be the best pixel-wise process for a given image type and rendering intent. The proposed technique does not depend on what that process is, and can be applied easily if new and better gamut-mapping processes are discovered. Several processes are also available to provide the cluster analysis of (ii), and the number of regions can be selected a priori (supervised classification) or not (unsupervised). Some examples of applicable clustering techniques are k-means and gaussian maximum likelihood. In (iv), the key colors are moved further in from the gamut surface so that more colors in this region are mapped within the gamut.

Figure 7:
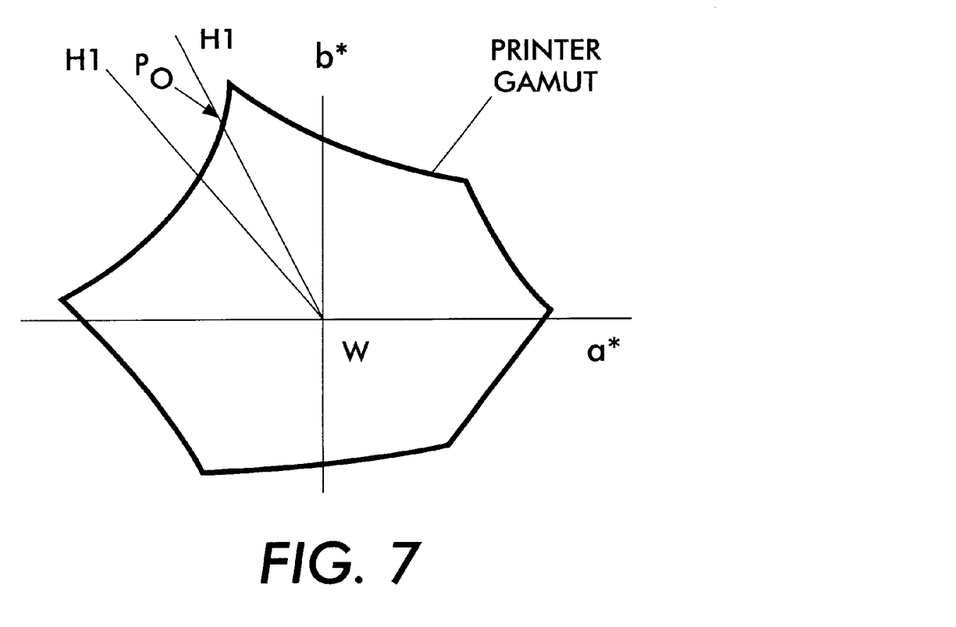
FIGS. 7, 8, and 9 describe pixelwise gamut-mapping techniques suitable for use in the present invention.

Useful mapping functions $G_T$ include:

With reference to FIG. 7, for a given input color, the hue angle thereof is obtained, and then the input color is mapped to the nearest point on the gamut surface within a range of hues about the input hue angle, where the range is greater than 0 and less than 90 degrees. A given point P, with hue angle H, is mapped to the closest point on the gamut surface within the region bounded by the lines W-H1 and W-H2.

Figure 8:
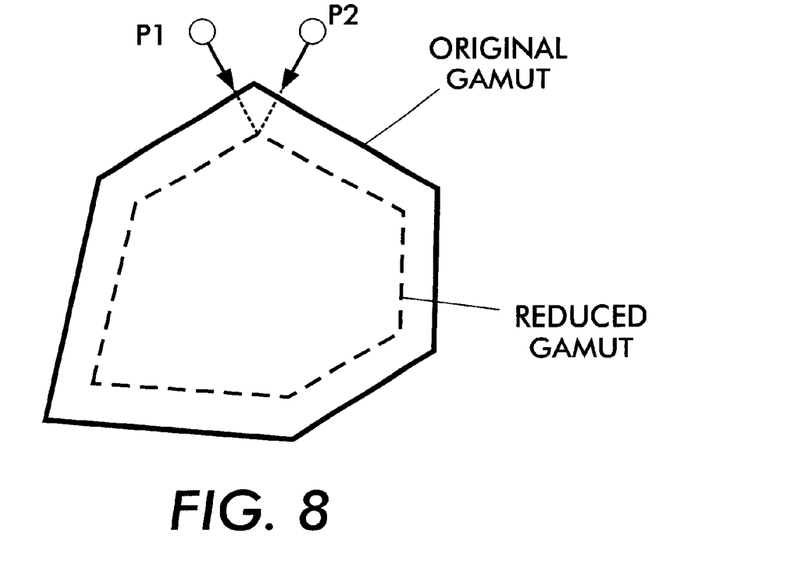

With reference to FIG. 8, a reduced gamut is defined by reducing the chroma of each surface point by a predetermined scale factor. For a given input color, a gamut-mapping vector is defined as the shortest distance to the reduced gamut. Map the input color to the original gamut surface in the direction given by this vector.

Figure 9:
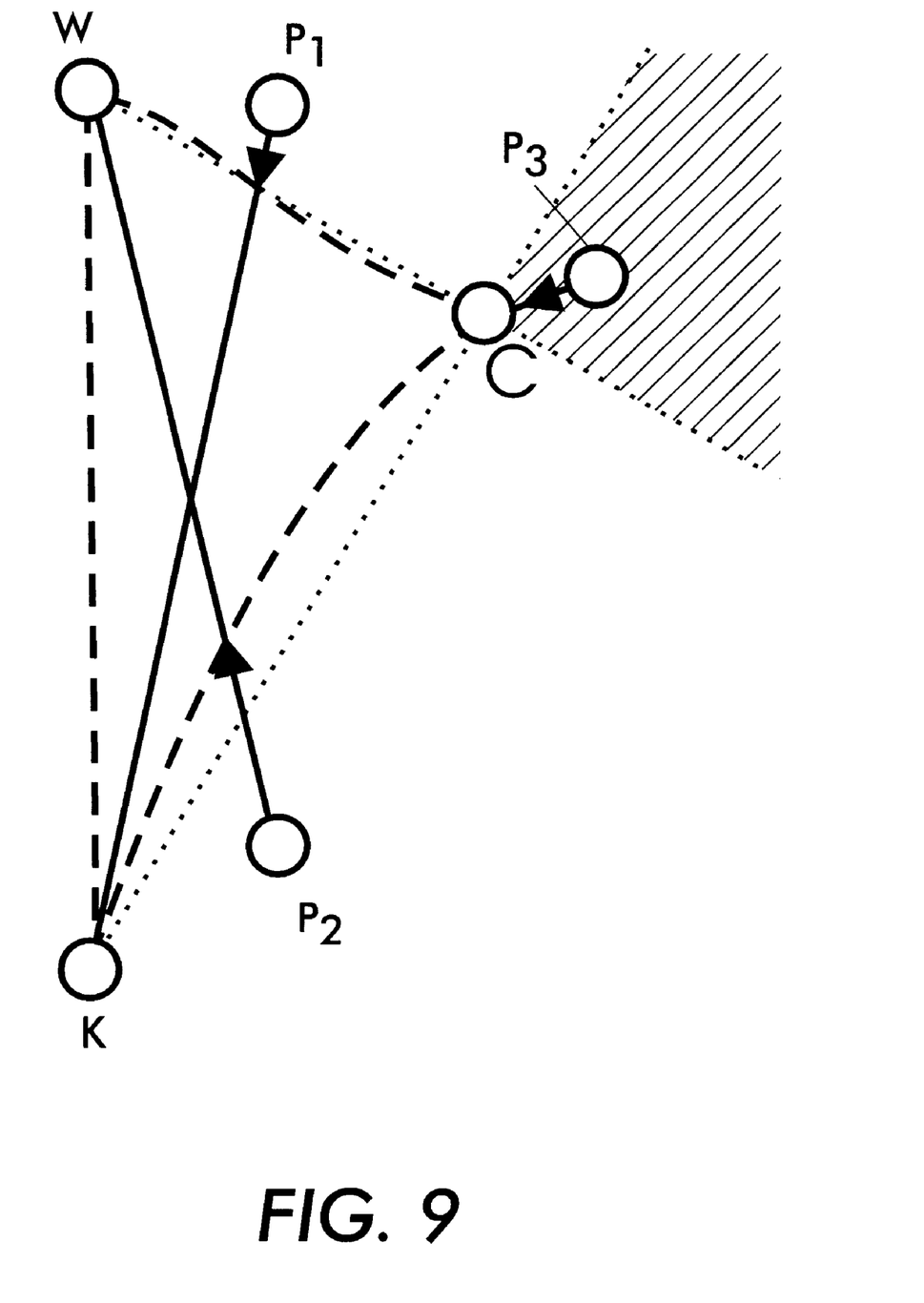

With reference to FIG. 9, Point C is defined as the point of maximum chroma in the hue plane of the input color. Drawing two lines, WC from white to C, and KC from black to C. All points in the shaded region (e.g. P3) are mapped to point C. All points outside the shaded region whose luminance is greater than that of C (e.g. P1), are mapped to the surface in a direction towards black K. All points outside the shaded region whose luminance is less than that of C (e.g., P2), are mapped to the surface in a direction towards white W.

A variety of methods for determining a key color may be used. One possible method provides that a key color is determined as an average value for any cluster in said set of neighboring pixels and said target pixel. Key colors could also be manually identified as important to a user, or identified using other statistical analysis of the of the pixel block.

With reference again to FIG. 6, in the cases where more than one key color are identified in a given pixel block, it may be necessary to adjust the mappings of the key colors so that the luminance relationships are maintained, as in step (v). For example, one could determine the difference vector of key colors 1 and 2 before and after gamut-mapping operation $G_T$ is applied (L1-L2 and L1'-L2'). If the difference between these two vectors exceeds some threshold, then $G_T$ is modified to approach a lightness preserving transform for those colors. This step may not be necessary if the key colors are much different in hue. For example, if the lightness difference between a red and green adjacent region is diminished, much of the information is preserved because of the very different hues. However, if an orange and yellow with very different original luminance values were mapped to the same luminance in the output, the distinction between these regions would be lost. Hence, in this case, the mapped key colors would have to be adjusted to approach the luminance difference prior to the gamut-mapping operation $G_T$.

The distance-weighted average in (vii) of the key colors may be determined using a number of techniques. Shepard's interpolation has proven effective, wherein the weights are inversely proportional to the distances between the pixel color of interest and the key colors. More specifically, for a given pixel color $C_j$, let $C_i$, i=1, . . . , K be the K key colors in the N×M spatial neighborhood of pixel $C_j$, and let $V_i$ be the corresponding gamut-mapping vectors for these key colors. Denote $d_{ji}$ as the Euclidean distance between $C_j$ and $C_i$ in 3 dimensional color space. The gamut-mapping vector $V_j$ for the pixel of interest is then calculated by the following $$V_j = \sum_{i=1}^{K} w_{ji} V_i$$

rule. If $d_{ji}$ is less than a predetermined threshold, T, set $V_j=V_i$. If $d_{ji}$ is greater than T, calculate $V_j$ by the formula:

where $$w_{ji} = \frac{1/d_{ji}^4}{\sum_{k=1}^{K}(1/d_{jk}^4)}$$

The threshold T is appropriately chosen to avoid the singularity in the calculation of $w_{ji}$ as $d_{ji}$ approaches 0. Note that the weights, $w_i$, are normalized to sum to one.

It is an important aspect of the present invention that the same input color may map to different output colors depending on its neighborhood.

Figure 10:
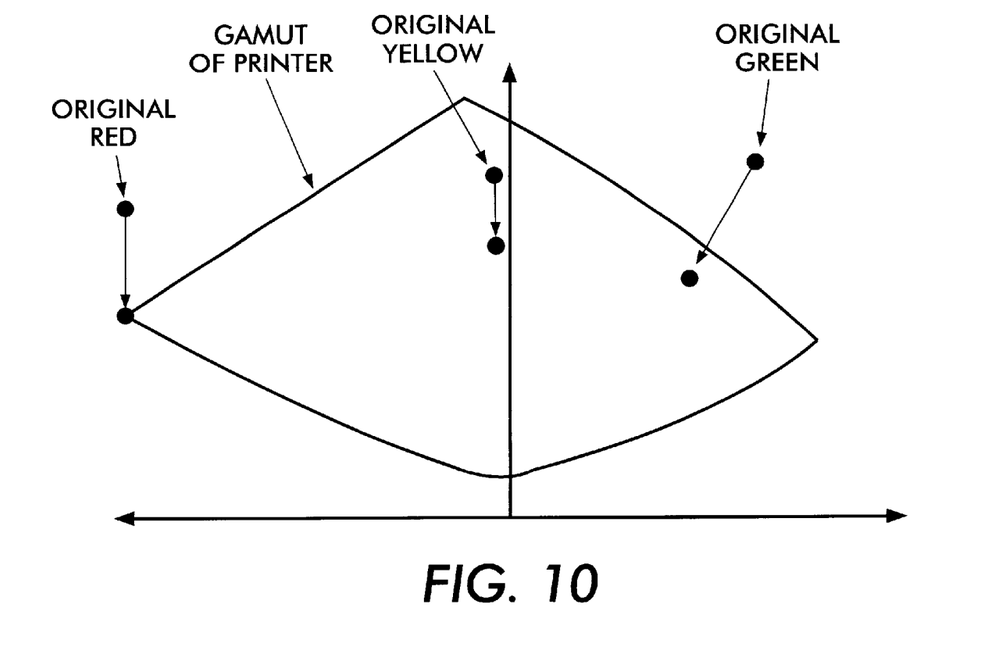
FIGS. 10–14 illustrate the impact of the present invention on various problems, including those illustrated in FIGS. 1 and 3.

With reference to FIGS. 3, 4, and 10, and looking at the problem presented in FIGS. 3 and 4, where a yellow line artifact is present between red and green regions, it is desirable to map the yellow relative to its surrounding colors, such that it is darkened and remains invisible compared to the green region. To determine what color to map a yellow pixel to, the N×M window sits halfway on the red and green regions, and the colors in these two regions are extracted as key colors. As illustrated in FIG. 10, the mapping vectors are determined for these colors with the base algorithm $G_T$, and it is determined that they both map to darker colors. Then, applying the weighted average of these two mapping vectors to the yellow color results in mapping it to a darker color. It is now much less visible than it was in FIG. 4. The advantage of the proposed technique is that the yellow is mapped based on its neighborhood. It is not preferable to map the same yellow to this relatively dark yellow when it is a large and important region in the image. The proposed invention would, in this case, preserve the light yellow.

Figure 11:
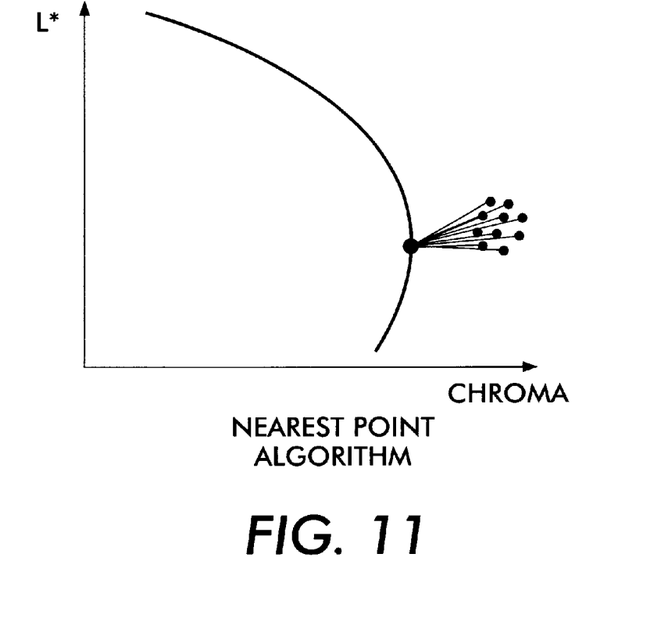
Figure 12:
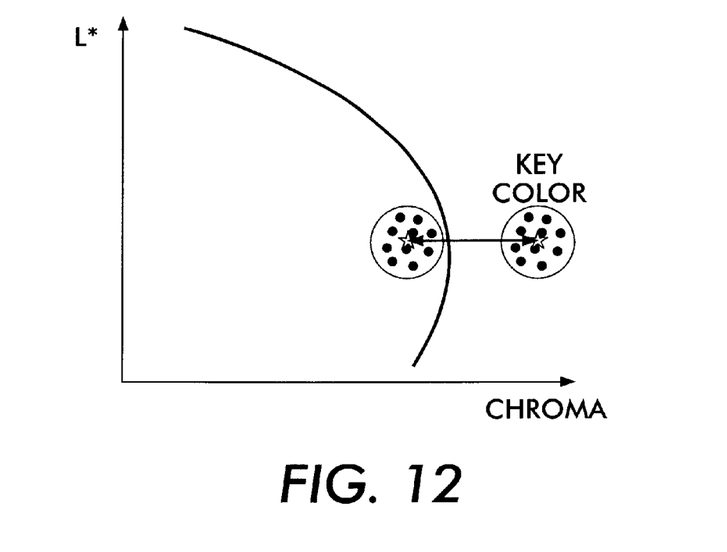

In another example of the advantage of the present invention, and with reference to FIG. 11 and 12, consider a region of color that is textured, such that a "cloud" of colors appears in color space. If the cloud of colors occurs near a corner or edge of the gamut surface, many colors may be mapped to one color if a standard nearest-point algorithm is used. FIG. 11 illustrates the resulting mapping with this standard gamut-mapping process. If any one of these colors were instead a solid region of color, that nearest point on the surface would likely be an excellent choice for the reproduced color. However, in this case, the texture is completely lost due to this many-to-one mapping. In the proposed process, the clustering (performed on the base-mapped image) results in the textured region being selected as one cluster. The average of this cluster is mapped into the output space. A pixel that is not the average is mapped in a direction that preserves its relationship with the average. FIG. 12 shows the resulting mapping for this region of color.

Figure 1:
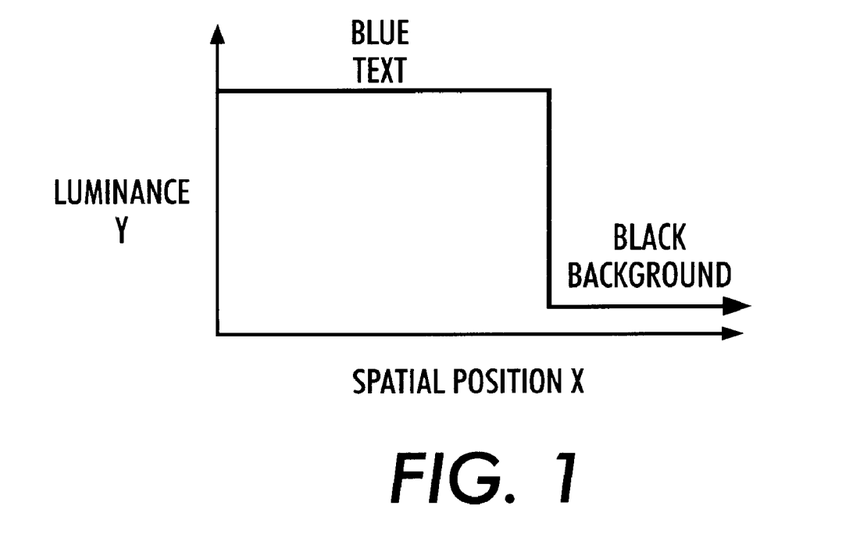
FIGS. 1, 2, 3 and 4 illustrate artifacts generated by out-of-gamut processing.
Figure 2:
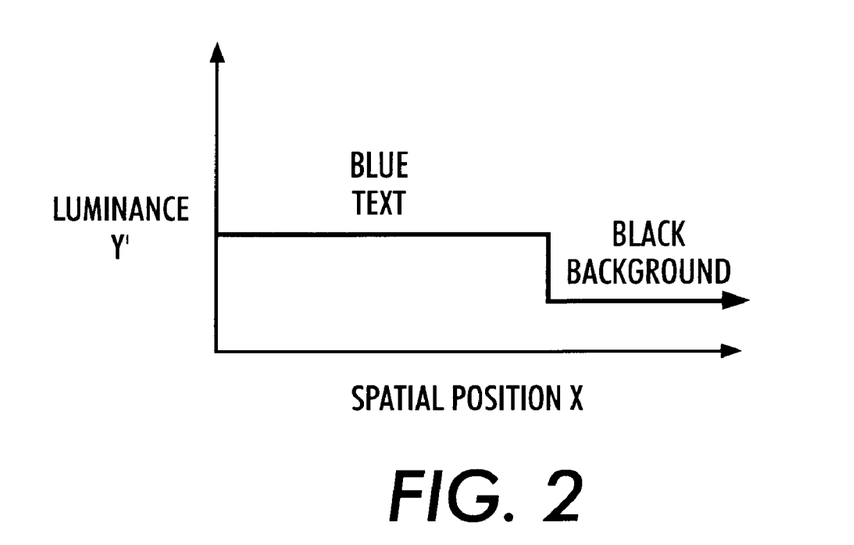
Figure 13:
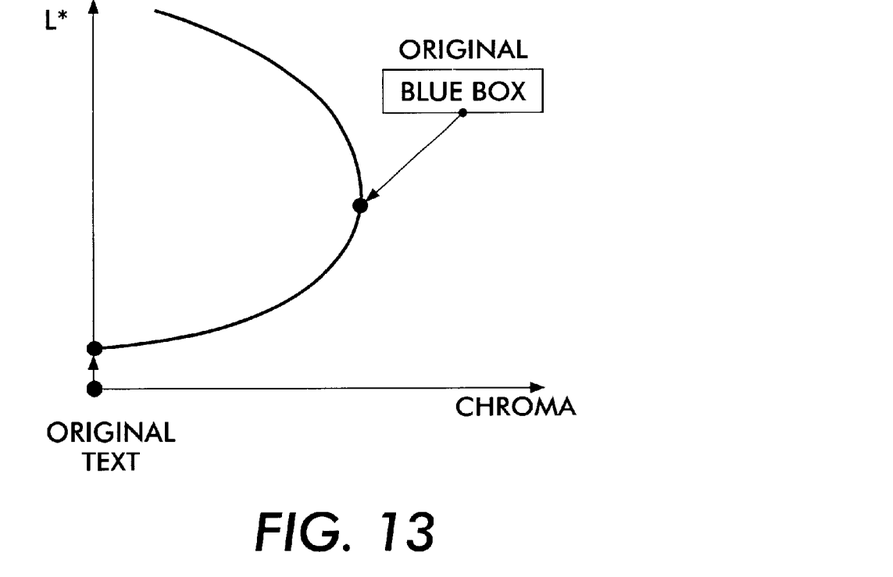
Figure 14:
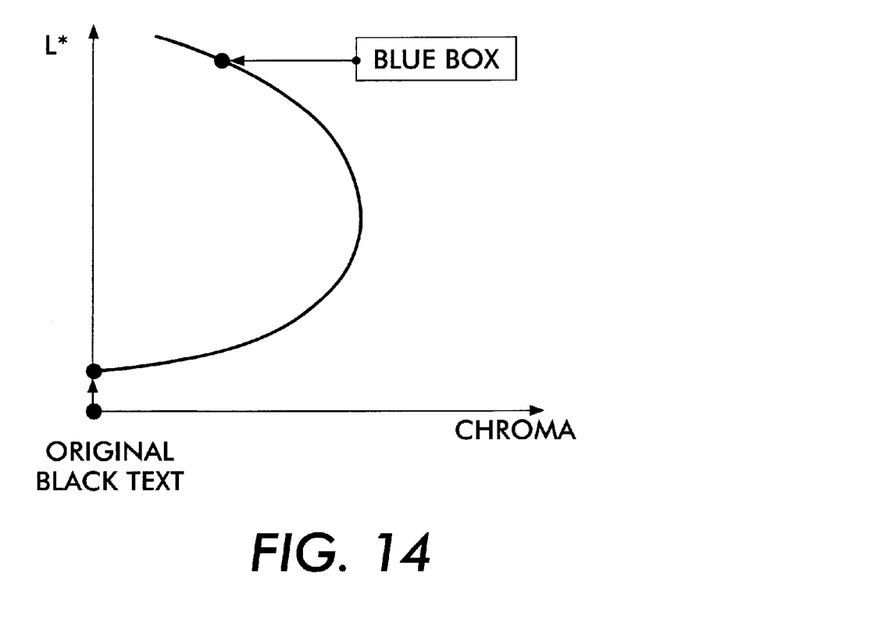

In another example, and with reference to FIGS. 1 and 2, and 13 and 14, a graphic designer using a CRT display chooses to put black text on a blue box. The luminance value of the background is considerably higher than that of the text, as shown in FIG. 1. No printer can make the light saturated blue that a monitor can; many traditional algorithms map the blue to a significantly darker blue as shown in FIG. 13. The black text is now very close in luminance to the background, as shown in FIG. 2, and is no longer legible. With the proposed method, it is determined in step (vi) that the luminance relationship between the two key colors is not maintained using the base algorithm. Therefore, luminance-preserving chroma clipping is used for these pixels and blue is mapped to a light but desaturated blue as shown in FIG. 14. The black text is now legible. The desaturation of the blue is acceptable since the text is the important information, whereas for a solid region of blue a more saturated color is preferred (and predicted by the algorithm). The technique described maps the colors to preserve the relationship among the colors in a local neighborhood rather than mapping the pixels independently, and therefore the text information is maintained.

The examples illustrate where it is desirable to change the colors predicted by traditional gamut mapping in order to preserve information from the original image. In each case, the output color or colors selected by the proposed algorithm would have been different if the colors were large areas of solid colors. The desire in color reproduction of images is not to reproduce the closest colors to the original, but to reproduce the information and intent of the original. This information depends heavily on the spatial content of the image, and the algorithm described here is one technique for using the local neighborhood of a pixel to predict its reproduced color, and to preserve the information in the original.

The proposed algorithm reduces or eliminates many of the JPEG and antialiasing artifacts.

It will no doubt be appreciated that the present invention can be accomplished through application software accomplishing the functions described, to operate a digital computer or microprocessor, through a hardware circuit, or through some combination of software and hardware.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of remapping colors in an original document, preparatory to use in a system having an output system gamut different than originally applied, including:

for a target pixel in a set of pixels defining at least a portion of an image, storing a set of neighboring pixels including said target pixel, wherein said target pixel and neighboring pixels form an N×M set of pixels in said image;

analyzing said set of neighboring pixels, determining at least one cluster for pixels therein;

determining at least one cluster metric for each said cluster;

determining at least one key color within each said cluster in said set of pixels;

using said at least one cluster metric, mapping said at least one key color to a color inside said output system gamut;

from said at least one remapped key color, determining at least one mapping vector representing the change thereof; and using said at least one mapping vector to remap target pixel.

2. A method as defined in claim 1, wherein N=M=10.

3. A method as defined in claim 1, wherein said cluster metrics include a metric measuring cluster variance.

4. The method as defined in claim 3, wherein said key color is remapped to a new key color in said output system gamut, using variance measurements to assure that any cluster surrounding said key color is substantially included within said output system gamut.

5. The method as defined in claim 4, wherein greater values of said cluster variance measurement require remapping said key color a greater color distance beyond a boundary of said output color gamut.

6. A method as defined in claim 1, wherein said cluster metrics include a metric measuring cluster size.

7. A method as defined in claim 1, wherein said cluster metrics include a metric measuring the cluster mean.

8. The method as defined in claim 1, wherein said at least one key color is determined as an average value for any cluster in said set of neighboring pixels and said target pixel.

9. The method as defined in claim 1, wherein said key color is remapped to a new key color in said output system gamut, using said cluster metric measurements to assure that any cluster surrounding said key color is substantially included within said output system gamut.

10. The method as defined in claim 1, wherein subsequent to remapping said target pixel, said target pixel is compared with a boundary of said output system gamut to assure that said target pixel is there within.

11. The method as defined in claim 1, wherein said at least one key color number two or more.

12. The method as defined in claim 11, wherein subsequent to remapping said at least two key colors, luminance values thereof are compared to prior luminance values, and adjusted to assure that the luminance relationships between the said at least two key colors have been approximately maintained during remapping.

13. The method as defined in claim 1, wherein said target pixel is remapped to a color in said output gamut by an amount determined by a distance-weighted average of mapping vectors.

14. A method of remapping colors in an original document, preparatory to use in a system having an output system gamut different than originally applied, including:

for a target pixel in a set of pixels defining at least a portion of an image, storing a set of neighboring pixels including said target pixel, wherein said target pixel and neighboring pixels form an N×M set of pixels in said image;

identifying a color context within said set of pixels;

using said color context, mapping said at least one key color to a color inside said output system gamut;

from said remapped key color, determining an amount of change to be applied to said target pixel; and using said amount of change to remap said target pixel.

15. A device for remapping colors in an original document, preparatory to use in a system having an output system gamut different than originally applied, including:

an image input device, receiving images defined in terms of pixels having colors of an input gamut;

an image processing system, including a gamut remapping function, remapping input gamut defined pixels to output system gamut defined pixels;

said image processing system including a computational device operating in accordance with a program providing that provides the following processing for each pixel in the received image:

for a target pixel in a set of pixels defining at least a portion of an image, storing a set of neighboring pixels including said target pixel, wherein said target pixel and neighboring pixels form an N×M set of pixels in said image;

analyzing said set of neighboring pixels, determining at least one cluster metric for clusters therein;

determining at least one key color within said set;

using said at least one cluster metric, mapping said at least one key color to a color inside said output system gamut;

from said remapped key color, determining a mapping vector representing the change thereof; and using said mapping vector to remap target pixel;

a document output, availing said remapped target pixels to a output device for display, print, or storage.

* * * * *